United States Patent
Obara et al.

(10) Patent No.: US 9,898,420 B2
(45) Date of Patent: Feb. 20, 2018

(54) ELECTRONIC DEVICE, OPERATING SYSTEM AND ACCESS CONTROL METHOD FOR PROTECTION OF A REGISTER THROUGH AN APPLICATION PROGRAMMING INTERFACE

(71) Applicant: YOKOGAWA ELECTRIC CORPORATION, Musashino-shi, Tokyo (JP)

(72) Inventors: Kazuyuki Obara, Musashino (JP); Katsuhiko Toba, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 217 days.

(21) Appl. No.: 14/331,414

(22) Filed: Jul. 15, 2014

(65) Prior Publication Data
US 2015/0026425 A1 Jan. 22, 2015

(30) Foreign Application Priority Data
Jul. 16, 2013 (JP) ................................ 2013-147733

(51) Int. Cl.
G06F 12/00 (2006.01)
G06F 12/14 (2006.01)
G06F 21/54 (2013.01)

(52) U.S. Cl.
CPC ...... *G06F 12/1416* (2013.01); *G06F 12/1441* (2013.01); *G06F 12/1458* (2013.01); *G06F 21/54* (2013.01)

(58) Field of Classification Search
CPC .. G06F 12/1416; G06F 12/1458; G06F 21/54; G06F 12/1441
See application file for complete search history.

(56) References Cited

U.S. PATENT DOCUMENTS 8,402,229 B1 * 3/2013 Wilt ..................... G09G 5/001
711/150
9,003,402 B1 * 4/2015 Carbone ............. G06F 9/45554
718/1

(Continued)

FOREIGN PATENT DOCUMENTS

CN 102736983 A 10/2012
CN 102763092 A 10/2012

(Continued)

OTHER PUBLICATIONS

μITRON4.0 Specification Protecting Function Extension 2.3.2 Access Protection of Memory Object; 4.1 Memory Object Control Function (p. 113 to p. 116); Ver. 1.00.00; 2002; 22 pages total.

(Continued)

*Primary Examiner* — John A Lane
(74) *Attorney, Agent, or Firm* — Sughrue Mion, PLLC (57) ABSTRACT

An electronic device includes a memory protection unit configured to protect an access to a register of a device arranged in an address space. An operating system sets an access right to the register by using the memory protection unit. A process requests the operating system to operate the device when the process operates the device, and the operating system makes an access to the corresponding register in accordance with the request for the operation to operate the device.

7 Claims, 13 Drawing Sheets

(56) References Cited

U.S. PATENT DOCUMENTS

| | | | |
|---|---|---|---|
| 2006/0143350 A1* | 6/2006 | Miloushev | G06F 9/5016 |
| | | | 710/242 |
| 2009/0125700 A1 | 5/2009 | Kisel | |
| 2009/0210644 A1 | 8/2009 | Batifoulier et al. | |
| 2011/0202739 A1 | 8/2011 | Grisenthwaite | |
| 2013/0019081 A1 | 1/2013 | Moyer | |
| 2014/0055467 A1* | 2/2014 | Bittner | G06F 3/14 |
| | | | 345/520 |
| 2015/0128113 A1* | 5/2015 | Skoglund | G06F 8/41 |
| | | | 717/140 |

FOREIGN PATENT DOCUMENTS

| | | |
|---|---|---|
| JP | 581045 A | 4/1993 |
| JP | 2013-120430 A | 6/2013 |

OTHER PUBLICATIONS

Communication from the European Patent Office dated Nov. 18, 2014, in a counterpart European Application No. 14176470.4.
Communication issued by the European Patent Office dated Nov. 2, 2017 in counterpart European Patent Application No. 14176470.4.
Andrew S Tanenbaum, "Modern Operating Systems", Dec. 21, 2007, pp. 47-59 (total 7 pages), XP055419207, ISBN: 978-0-13-600663-3, http://stst.elia.pub.ro/news/SO/Modern%20Operating%20System%20-%20Tanenbaum.pdf [retrieved Oct. 25, 2017].

* cited by examiner

Prior Art

Prior Art

Prior Art

*FIG. 12*

Prior Art

FIG. 13

ELECTRONIC DEVICE, OPERATING SYSTEM AND ACCESS CONTROL METHOD FOR PROTECTION OF A REGISTER THROUGH AN APPLICATION PROGRAMMING INTERFACE

CROSS-REFERENCE TO RELATED APPLICATION(S)

The present application claims the benefit of priority of Japanese Patent Application No. 2013-147733 filed on Jul. 16, 2013. The disclosures of the application are incorporated herein by reference.

BACKGROUND

Technical Field

The present disclosure relates to an electronic device having a memory protection unit which protects an access to a register of a device arranged in an address space, an operating system which operates in this electronic device and an access control system.

Related Art

In an electronic device such as a field device, a process operating on an operating system frequently performs an operation of a device having a register arranged in an address space. Here, an example of the process which operates a GPIO (General Purpose Input/Output) will be described. The GPIO indicates a general purpose IO and is a terminal which can arbitrarily operate an input and output by software.

Figure 10:
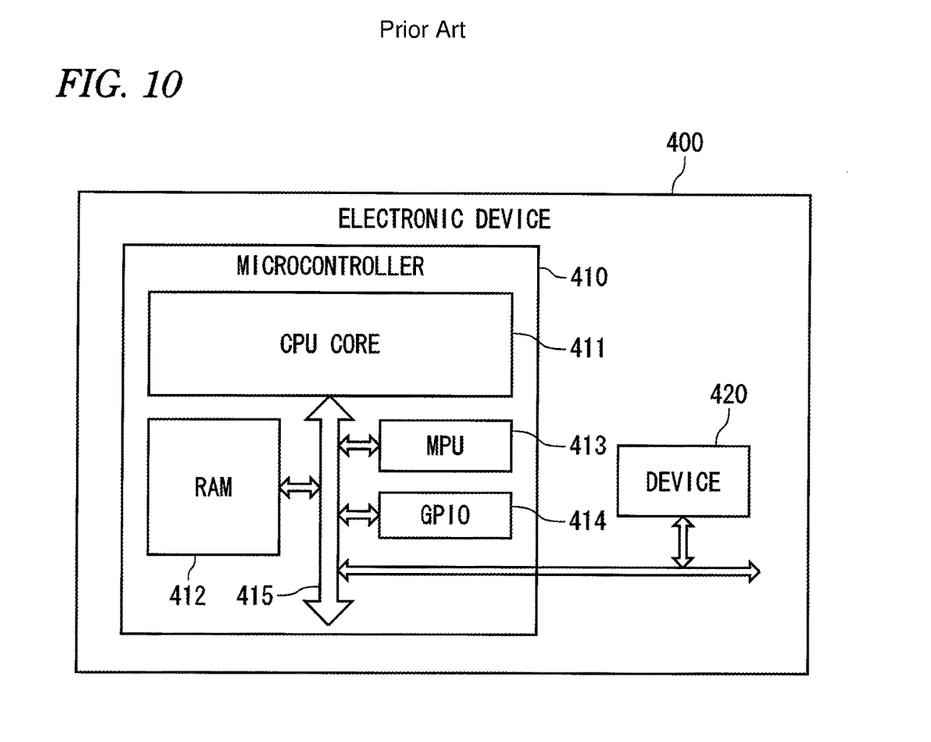
FIG. 10 is a block diagram showing a structure example of main parts of an electronic device including a microcontroller and a device.

FIG. 10 is a block diagram showing a structure example of main parts of an electronic device 400 including a microcontroller 410 and a device 420. As shown in FIG. 10, the microcontroller 410 includes a CPU CORE 411, a RAM 412, an MPU (Memory Protection Unit) 413 and a GPIO 414 which are mutually connected through a bus 415. To the bus 415, the device 420 is also connected. As the device 420, various devices may be used which meet uses of the electronic device 400 such as a storage device, a sensor, an input and output device or the like.

On the CPU CORE 411, an RTOS (Real-Time Operating System) operates and a plurality of processes are supposed to operate on the RTOS. The RTOS provides various services respectively to the processes via a process management or an API (Application Programming Interface).

The MPU 413 is a memory protection unit and performs a protection of an access to a register of the GPIO 414 or the like arranged in the address space. Specifically, when the RTOS sets an access right to the MPU 413 in accordance with a request from the process, the MPU 413 permits an access of the process which makes the request. On the other hand, for the process to which the access right is not allocated, the MPU 413 detects an illegal access and does not permit an access. Other unit having an access protecting function such as an MMU (Memory Management Unit) may be used in place of the MPU 413.

Figure 11:
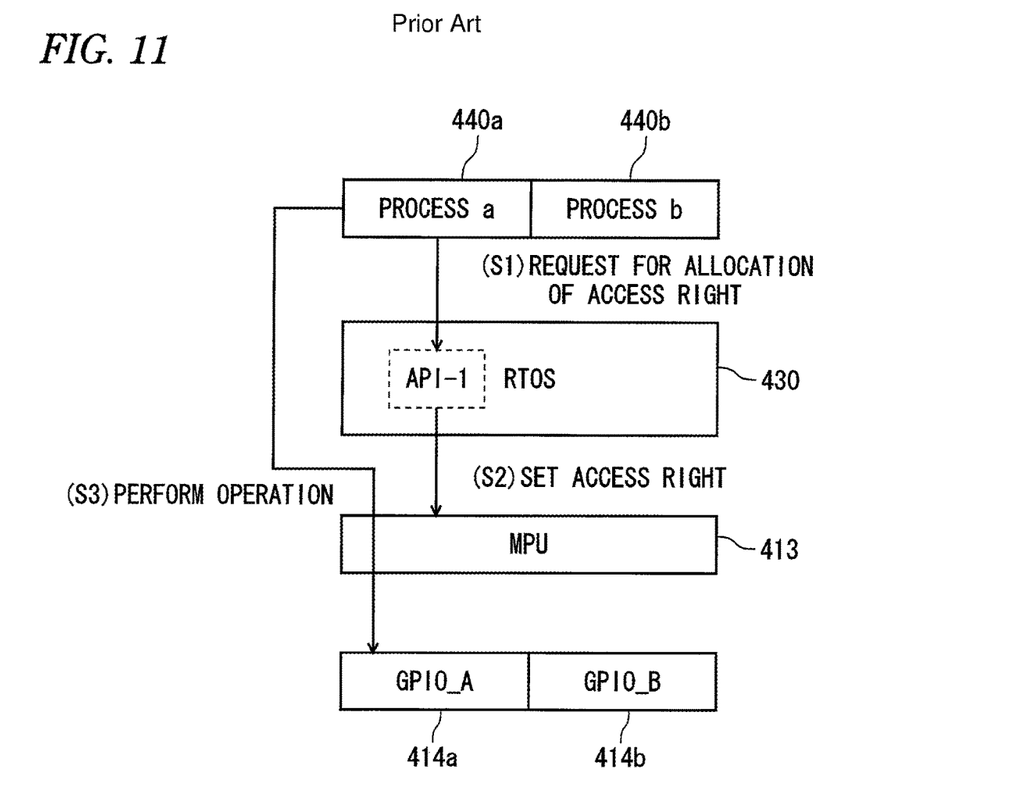
FIG. 11 is a diagram for explaining a procedure that a process operating on a RTOS operates a GPIO.

FIG. 11 is a diagram for explaining a procedure that the process operating on the RTOS 430 operates the GPIO 414 in the electronic device having the above-described structure. Here, a process a 440a and a process b 440b are supposed to operate on the RTOS 430 as independent programs.

Further, the GPIO 414 is supposed to be partitioned at intervals of prescribed bits such as 8 bits and treated as two groups of a GPIO_A 414a and a GPIO_B 414b. Here, the process a 440a is supposed to operate the GPIO_A 414a and the process b 440b is supposed to operate the GPIO_B 414b. Namely, the GPIO_A 414a is assigned as an exclusive device of the process a 440a and the GPIO_B 414b is assigned as an exclusive device of the process b 440b.

The API prepared by the RTOS 430 includes an API-1 which is used to request for allocation of the access right to a GPIO register as a register for operating the GPIO 414. In order to operate the GPIO 414 by the process, the process needs to previously request the access right to be allocated by using the API-1. In accordance with the request, the API-1 operates the MPU 413 to set the access right thereto.

In an example shown in FIG. 11, the process a 440a requests the RTOS 430 to allocate the address space where a GPIO_A register is present to the process a 440a via the API-1 (S1).

Figure 12:
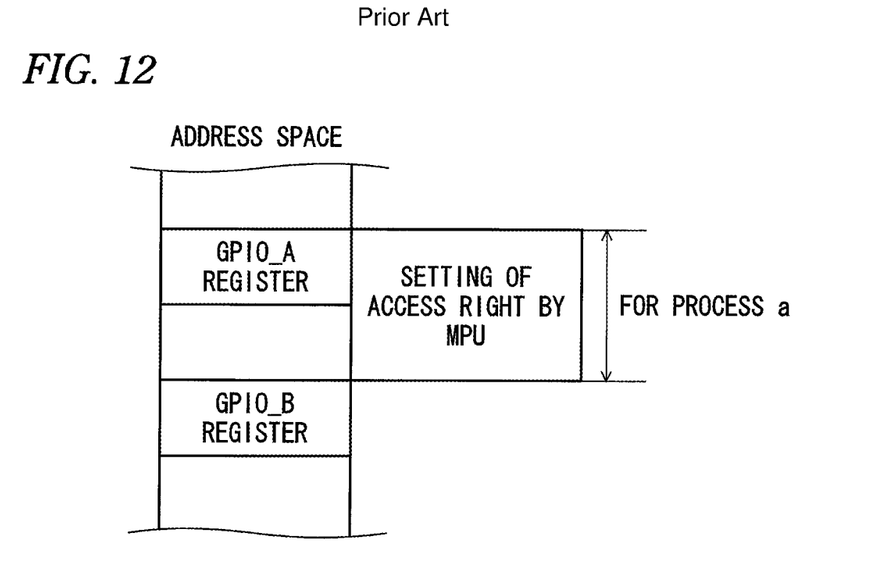
FIG. 12 shows a state that an access right for a process a is set to an address space where a GPIO_A register is present in a MPU.

When the access right to the GPIO_A register is not yet set, the API-1 of the RTOS 430 sets the access right for the process a 440a to the address space where the GPIO_A register is present (S2). FIG. 12 shows a state that the access right for the process a 440a is set to the address space where the GPIO_A register is present in the MPU 413.

Under this state, since the access right to the GPIO_A register is set for the process a 440a, the MPU 413 permits the process a 440a to access to the GPIO_A register. Accordingly, the process a 440a can access to the GPIO_A register to operate the GPIO_A 414a (S3).

The process b 440b can also operate the GPIO_B 414b in accordance with the same procedure. On the other hand, when the process a 440a accesses to a GPIO_B register, since the access right to the GPIO_B register is not set for the process a 440a, an access violation is detected by the MPU 413.

A setting of the access right to the address space and an access control by the MPU 413 can be performed not only to the GPIO registers, but also to various kinds of devices 420 with registers arranged in the address spaces.

PRIOR ART LITERATURE

Non-Patent Literature

[Non-Patent Literature 1] μITRON4.0 Specification Protecting Function Extension 2.3.2 Access Protection of Memory Object, 4.1 Memory Object Control Function (p.113 to p.116)

As described above, the RTOS 430 operates the MPU 413 in accordance with the request of the process 440 so that the access right to the register arranged in the address space can be set. Then, the MPU 413 permits the access from the process 440 the access right of which is set to the MPU 413.

However, an access management to the register arranged in the address space is limited by a specification of the MPU 413 as hardware, so that a degree of freedom is not necessarily high. This is because of a below-described reason. When the MPU 413 is realized by restricted resources in view of a cost and a size, functions sometimes need to be necessarily restricted to avoid a complication.

Figure 13:
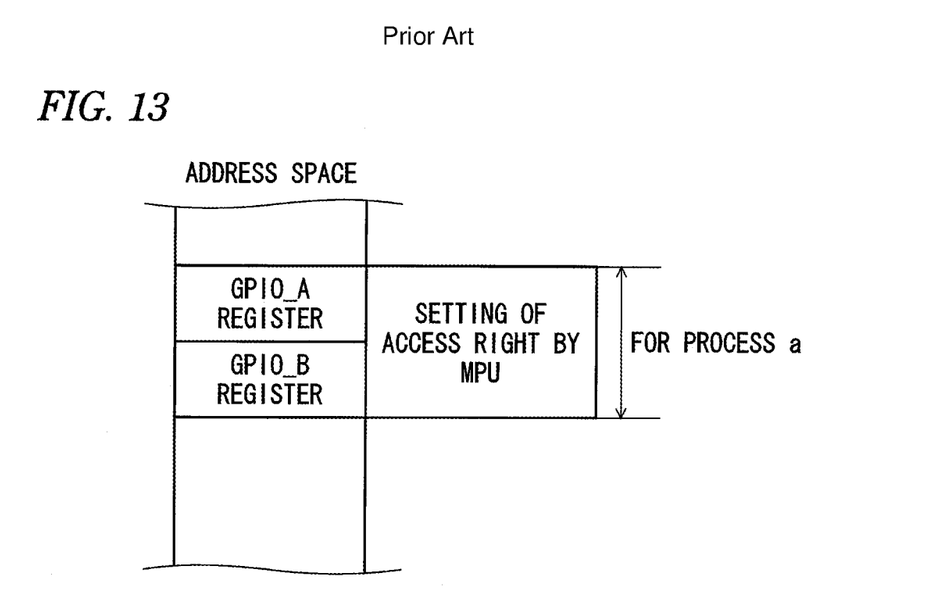
FIG. 13 is a diagram for explaining problems due to boundary limitation of the MPU.

For instance, for the MPU 413, a boundary limitation is ordinarily determined. Thus, when the access right is set, a start address or a size is limited. Accordingly, depending on the arrangement of the register in the address space and the boundary limitation of the MPU 413, a setting area of the access right extend over the GPIO_A register and the GPIO_B register as shown in FIG. 13. Thus, a situation may probably arise that the GPIO_A 414a cannot be assigned as the exclusive device of the process a 440a and the GPIO_B 414b cannot be assigned as the exclusive device of the process b 440*b*. Even when the MMU is used in place of the MPU 413, the same problem may possibly arise due to a page boundary limitation.

Further, for the MPU 413, the number of the access rights which can be set thereto is ordinarily limited. Thus, a case may possibly arise that requests for allocation of the access rights from the processes cannot be respectively met.

SUMMARY

Exemplary embodiments of the invention provide an electronic device provided with a memory protection unit which protects an access to a register of a device arranged in an address space, an operating system and an access control system, which can improve a degree of freedom in an access control without suffering a limitation of the memory protection unit.

An electronic device according to an exemplary embodiment of the invention is an electronic device in which an operating system and a process operate, comprising:

a memory protection unit configured to protect an access to a register of a device arranged in an address space, wherein the operating system sets an access right to the register by using the memory protection unit, and wherein the process requests the operating system to operate the device when the process operates the device, and the operating system makes an access to the corresponding register in accordance with the request for the operation to operate the device.

In the electronic device, the process may make a declaration of an operation of the device to the operating system before the operation of the device, and the operating system does not accept a request for an operation from a process which does not make a declaration of an operation.

In the electronic device, when a plurality of processes make a declaration of an operation to the same device, the operating system may exclusively accept the declaration of the operation from the process which most firstly makes a declaration.

In the electronic device, the process may make a declaration of an operation for each unit of the device to be processed, and the operating system may operate the device for each unit of the device to be processed.

In the electronic device, the device may be a general purpose IO.

An operating system according to an exemplary embodiment of the invention is an operating system which operates in an electronic device including a memory protection unit configured to protect an access to a register of a device arranged in an address space, wherein the operating system sets an access right to the register by using the memory protection unit, and when the operating system receives a request for operating the device from a process operating on the operating system, the operating system makes an access to the corresponding register to operate the device.

An access control method according to an exemplary embodiment of the invention is an access control method in an electronic device including a memory protection unit configured to protect an access to a register of a device arranged in an address space, and an operating system and a process operating in the electronic device, the access control method comprising:

setting, by the operating system, an access right to the register by using the memory protection unit;

requesting, by the process, the operating system to operate the device when the process operates the device; and making, by the operating system, an access to the corresponding register in accordance with the request for the operation to operate the device.

According to the exemplary embodiments of the invention, it is possible to improve a degree of freedom in an access control without suffering a limitation of the memory protection unit in the electronic device.

DETAILED DESCRIPTION

Figure 1:
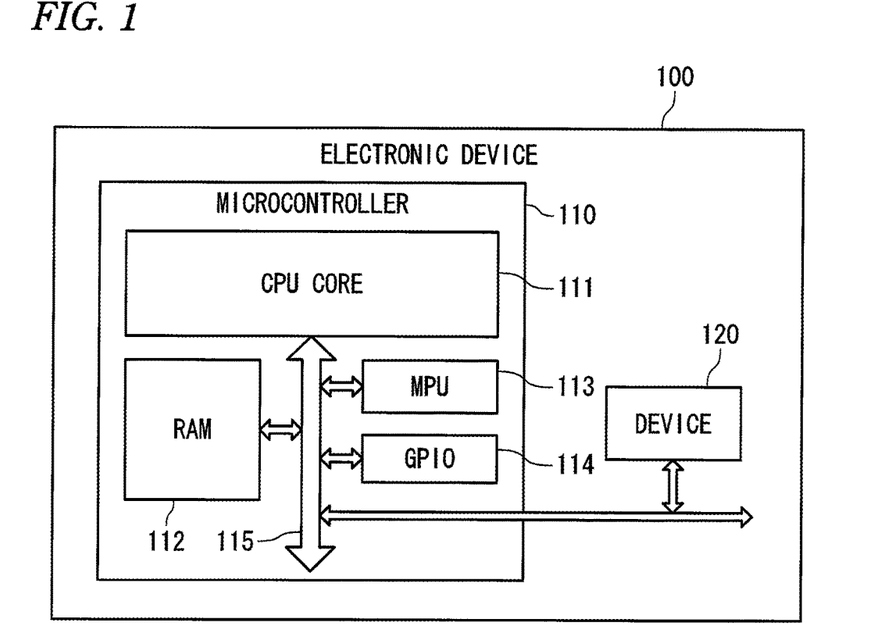
FIG. 1 is a block diagram showing a structure example of main parts of an electronic device of an exemplary embodiment including a microcontroller and a device.

An exemplary embodiment of the present invention will be described below by referring to the drawings. FIG. 1 is a block diagram showing a structure example of main parts of an electronic device 100 of the present exemplary embodiment including a microcontroller 110 and a device 120. The electronic device 100 can be formed as, for instance, as a field device. The present invention can be particularly effectively applied to a device that meets Functional Safety in which a process relating to a safety and a process relating to a non-safety are coexistent and operate. However, the present invention is not limited to such a field device and may be applied to various electronic devices.

As shown in FIG. 1, the microcontroller 110 includes a CPU CORE 111, a RAM 112, an MPU (Memory Protection Unit) 113 and a GPIO 114 which are mutually connected through a bus 115. To the bus 115, the device 120 is also connected. As the device 120, various devices may be used which meet uses of the electronic device 100 such as a storage device, a sensor, an input and output device or the like.

On the CPU CORE 111, an RTOS (Real-Time Operating System) operates and a plurality of processes are supposed to operate on the RTOS. The RTOS provides various services respectively to the processes via a process management or an API (Application Programming Interface). However, an ordinary OS may be used in place of the RTOS.

The electronic device 100 of the present exemplary embodiment can be formed by using the same hardware as that of the related-art electronic device 400 and the RTOS and the processes operating on the RTOS as software are allowed to have new functions. Accordingly, a design of the hardware does not need to be changed, so that an access control which does not suffer a limitation of the MPU 113 can be advantageously realized in view of cost.

The MPU 113 is a memory protection unit and performs a protection of an access to a register of the GPIO 114 arranged in an address space. Specifically, when an access right is set to the MPU 113, the MPU 113 permits an access from an object which makes a request of the access right. When the access right is not set to the MPU 113, the MPU 113 detects an access violation and does not permit the access. Other unit having an access protecting function such as an MMU (Memory Management Unit) may be used in place of the MPU 113.

First Exemplary Embodiment

In the electronic device 100 having the above-described structure, will be described below a first exemplary embodiment of a procedure that the process operating on the RTOS 130 operates the GPIO 114. Here, a process a 140*a* and a process b 140*b* are supposed to operate on the RTOS 130 as independent programs. Further, the GPIO 114 is supposed to be partitioned at intervals of prescribed bits such as 8 bits and treated as two groups of a GPIO_A 114*a* and a GPIO_B 114*b*.

Figure 2:
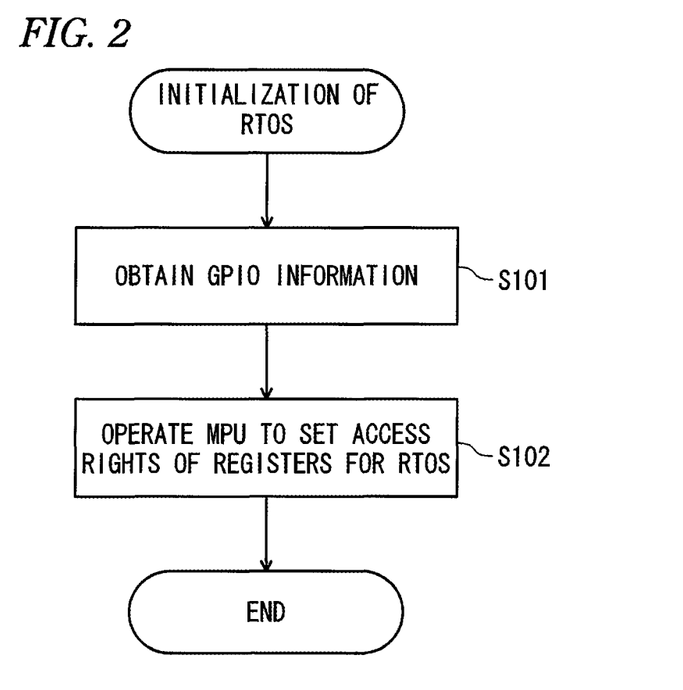
FIG. 2 is a flowchart for explaining a characteristic operation during an initialization of a RTOS.

FIG. 2 is a flowchart for explaining a characteristic operation during an initialization of the RTOS 130.

Figure 3:
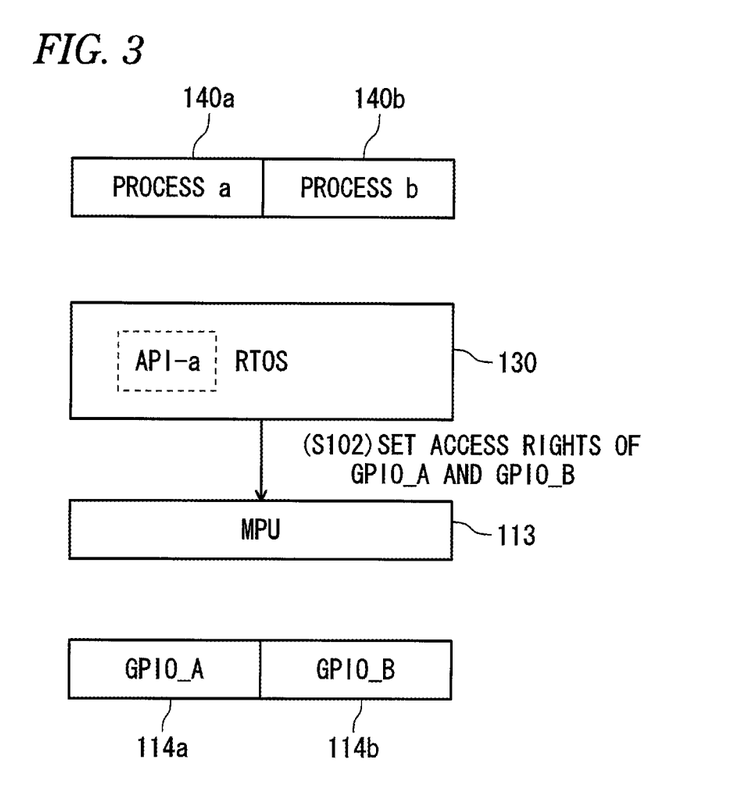
FIG. 3 is a diagram which schematically shows an operation during the initialization.

FIG. 3 is a diagram which schematically shows an operation during the initialization. In the first exemplary embodiment, as common in below-described exemplary embodiments, in the initialization during an activation, the RTOS 130 obtains information of the GPIO 114 (S101) and operates the MPU 113 to set access rights for the RTOS 130 to address spaces where the GPIO registers are respectively present (S102).

Figure 4:
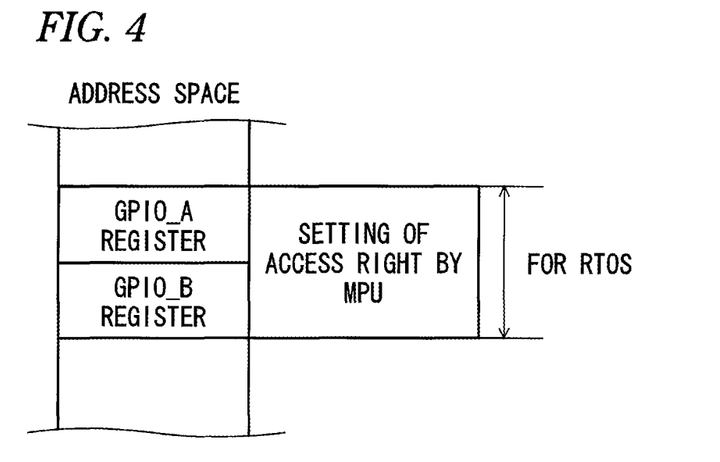
FIG. 4 is a diagram for explaining access rights of a MPU after the initialization

As a result, as shown in FIG. 4, the access rights of the MPU 113 after the initialization are set for the RTOS both in the GPIO_A register and the GPIO_B register. Not only the information of the GPIO 114, but also information of the device 120 as an object to be operated by the process may be collected to set an access right for the RTOS 130 to an address space to which a register of the device 120 is allocated.

Figure 5:
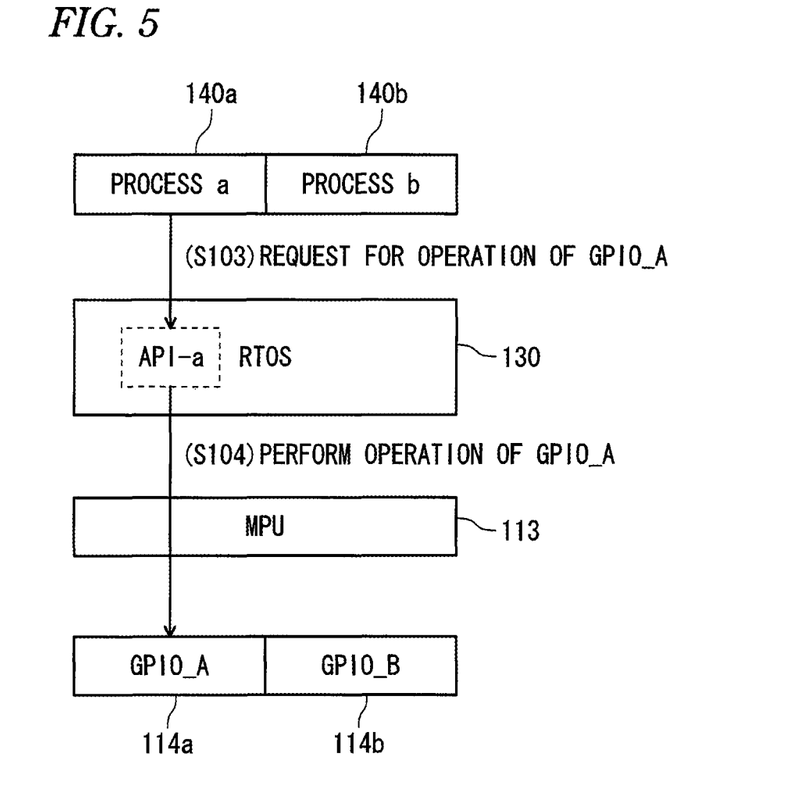
FIG. 5 is a diagram showing schematically an operation when a process operates a GPIO in a first exemplary embodiment.

FIG. 5 is a diagram showing schematically an operation when the process 140 operates the GPIO 114 in the first exemplary embodiment. In the first exemplary embodiment, the RTOS 130 prepares an API-a which receives a request for operating the GPIO from the process 140 and performs an operation of the GPIO.

When the process a 140*a* operates the GPIO_A 114*a*, the process a 140*a* requests for an operation of the GPIO_A by using the API-a (S103). As described above, in the first exemplary embodiment, the process 140 does not request the RTOS 130 to allocate the access right. Further, the process 140 does not directly operate the GPIO_A and uses the API-a to request the operation of the GPIO_A. In this stage, a setting of the access right is switched from during an execution of the process a 140*a* to during an execution of the RTOS 130.

Then, the API-a accesses to the GPIO_A register in accordance with the request to operate the GPIO_A 114*a* (S104). At this time, since the access right to the GPIO_A register is set for the RTOS 130, the MPU 113 permits an access of the RTOS 130 to the GPIO_A register.

Figure 6:
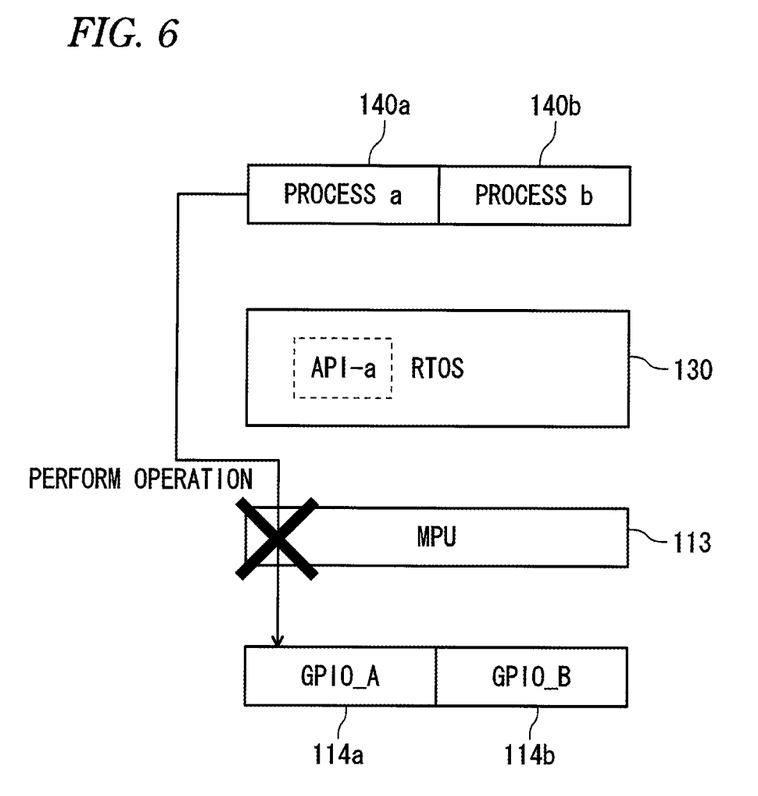
FIG. 6 is a diagram showing schematically a detection of an access violation by the MPU.

When the process a 140*a* or the process b 140*b* tries to directly access to the GPIO_A register, since the access right to the GPIO_A register is not set for the process a 140*a* or the process b 140*b*, an access violation is detected by the MPU 113 as shown in FIG. 6.

As described above, according to the first exemplary embodiment, the access rights are not respectively allocated to the individual processes 140, but the RTOS 130 sets the access rights together and accesses to the GPIO register in accordance with the request for an operation from the process 140. Accordingly, a degree of freedom in an access control can be improved without suffering a limitation of the MPU 113 due to a boundary limitation or a limitation of the number of the access rights which can be set.

Second Exemplary Embodiment

Figure 7A:
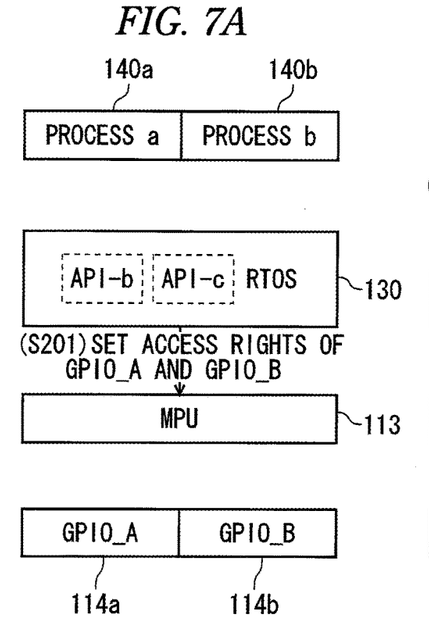
FIGS. 7A to 7D are diagrams which schematically show an operation of a second exemplary embodiment.

In an electronic device 100, will be described below a second exemplary embodiment of a procedure that a process operating on an RTOS 130 operates a GPIO 114. FIG. 7 is a diagram which schematically shows an operation of the second exemplary embodiment. As shown in FIG. 7A, in the second exemplary embodiment, the RTOS 130 obtains information of the GPIO 114 as in the first exemplary embodiment and operates an MPU 113 to set access rights for the RTOS 130 to address spaces where GPIO registers are respectively present (S201).

Figure 7B:
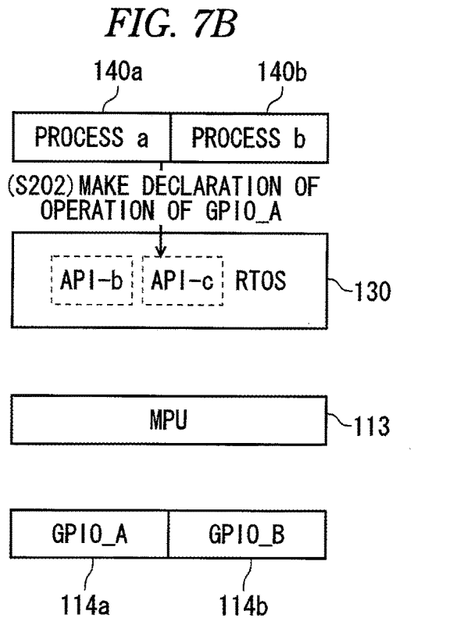

When the process a 140*a* operates the GPIO_A 114*a*, the process a 140*a* previously makes a declaration of an operation of the GPIO_A 114*a* to the RTOS 130 as shown in FIG. 7B (S202). An API-c which receives the declaration of the operation is prepared in the RTOS 130.

Further, the RTOS 130 prepares an API-b which receives a request for operating the GPIO 114 from the process 140 which makes a declaration of the operation and performs the operation of the GPIO 114. When the process 140 which requests for operating the GPIO 114 does not declare the operation of the GPIO 114, the API-b does not operate the GPIO 114.

Figure 7C:
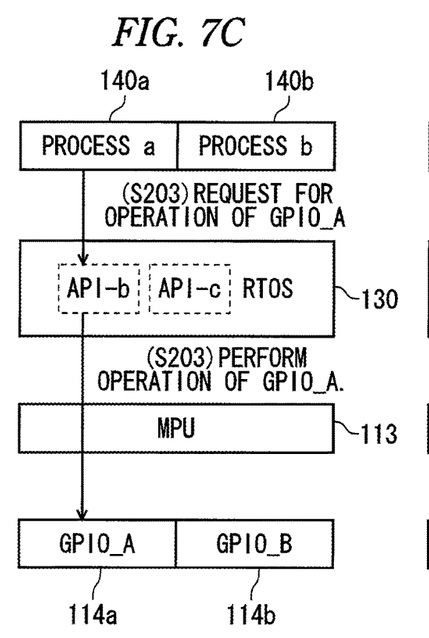

When the process a 140*a* operates the GPIO_A 114*a*, as shown in FIG. 7C, the process a 140*a* requests for an operation of the GPIO_A 114*a* by using the API-b (S203). Since the process a 140*a* makes a declaration of the operation of the GPIO_A 114*a*, the API-b makes an access to the GPIO_A register in accordance with the request to operate the GPIO_A 114*a* (S204). At this time, since the access right to the GPIO_A register is set for the RTOS 130 the MPU 113 permits the RTOS 130 to access to the GPIO_A register.

Figure 7D:
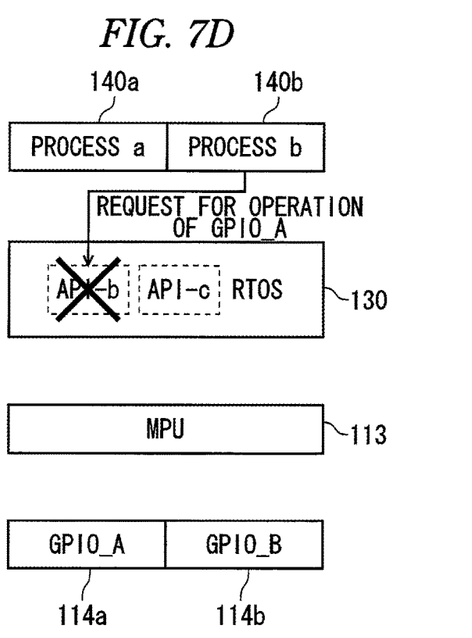

On the other hand, as shown in FIG. 7D, when the API-b receives a request for operating the GPIO_A 114*a* from the process b 140*b* which does not make a declaration of an operation of the GPIO_A 114*a*, the API-b does not make an access to the GPIO_A register, nor operate the GPIO_A 114*a*.

As described above, according to the second exemplary embodiment, a limitation of the MPU 113 due to a boundary limitation or a limitation of the number of the access rights which can be set is not received, and further, the operation is performed only to the request for operating the GPIO 114 from the process 140 which makes a declaration of the operation of the GPIO 114 in addition thereto. Thus, since an accessible GPIO 114 can be limited for each process 140, a degree of freedom in an access control can be more improved.

Third Exemplary Embodiment

Figure 8A:
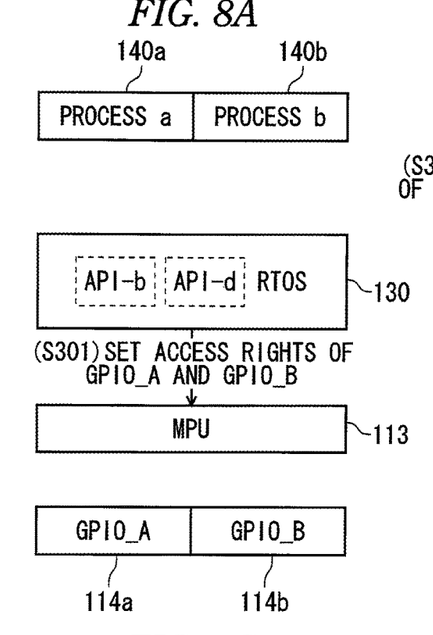
FIGS. 8A to 8D are diagrams which schematically show an operation of a third exemplary embodiment.

In an electronic device 100, will be described below a third exemplary embodiment of a procedure that a process operating on an RTOS 130 operates a GPIO 114. FIG. 8 is a diagram which schematically shows an operation of the third exemplary embodiment. As shown in FIG. 8A, in the third exemplary embodiment, the RTOS 130 obtains information of the GPIO 114 as in the first exemplary embodiment and operates an MPU 113 to set access rights for the RTOS 130 to address spaces where GPIO registers are respectively present (S301).

Figure 8B:
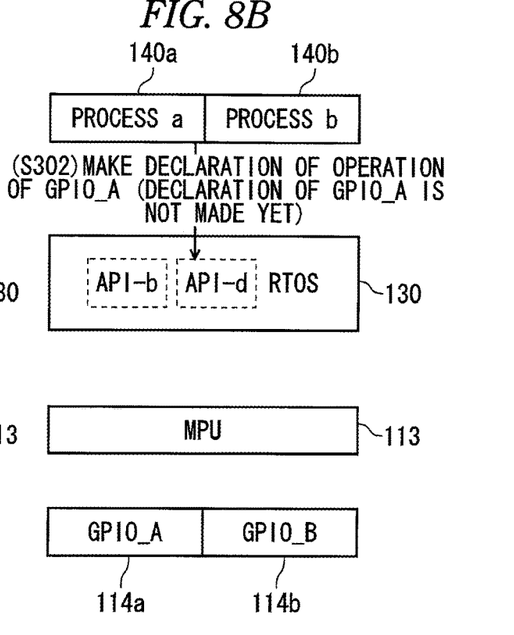

When the process a 140a operates the GPIO_A 114a as in the second exemplary embodiment, the process a 140a previously makes a declaration of an operation of the GPIO_A 114a to the RTOS 130 as shown in FIG. 8B (S302). In the third example, an API-d which receives the declaration of the operation is prepared in the RTOS 130.

Here, the API-d exclusively gives an operation right to the process 140 which first makes a declaration of an operation for the GPIO 114 and rejects the declaration of the operation for the same GPIO 114 from other process 140 which makes a declaration of the operation afterward. Namely, the API-d performs an exclusive control of the operation right.

Figure 8C:
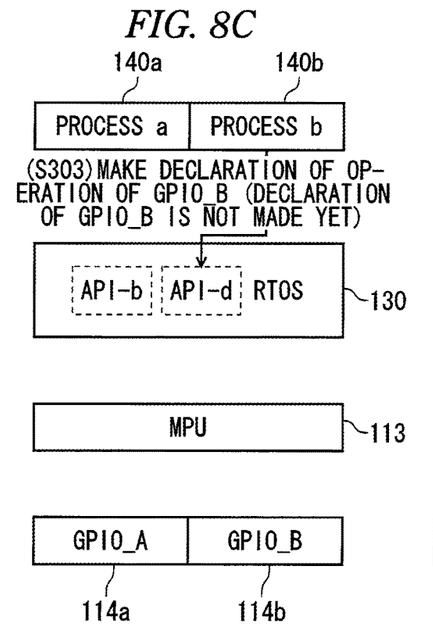

Accordingly, as shown in FIG. 8C, under a state that other process does not make a declaration of an operation of the GPIO_B 114b, when the process b 140b makes a declaration of an operation of the GPIO_B 114b, the API-d gives an exclusive operation right of the GPIO_B 114b to the process b 140b.

Figure 8D:
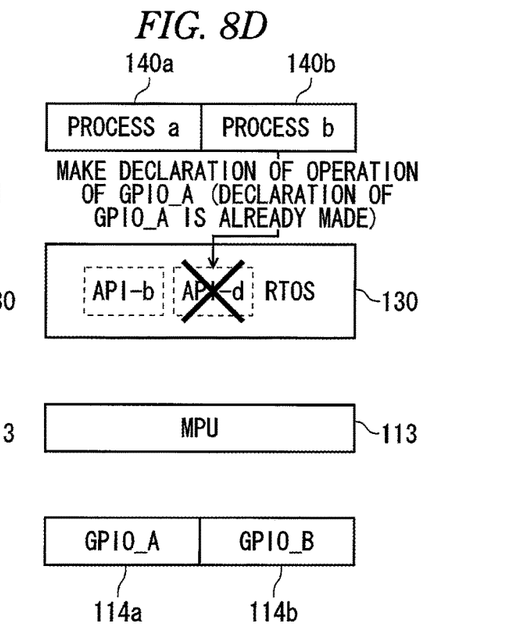

On the other hand, as shown in FIG. 8D, under a state that the process a 140a makes a declaration of an operation of the GPIO_A 114a, when the process b 140b makes a declaration of an operation of the GPIO_A 114a, the API-d rejects the declaration of the operation from the process b 140b.

The procedure that the process 140 which makes a declaration of the operation operates the GPIO 114 is the same as that of the second exemplary embodiment. Namely, the RTOS 130 prepares an API-b which receives a request for operating the GPIO 114 from the process 140 which makes a declaration of the operation and performs the operation of the GPIO 114 as in the second exemplary embodiment. When the process 140 which requests for operating the GPIO 114 does not make a declaration of the operation of the GPIO 114, the API-b does not operate the GPIO 114.

As described above, according to the third exemplary embodiment, a restriction of the MPU 113 due to a boundary limitation or a limitation of the number of the access rights which can be set is not received, and further, in addition thereto, the request for operating the GPIO 114 from the process 140 which makes a declaration of the operation thereof at the first is exclusively received. Thus, since an accessible GPIO 114 can be limited for each process 140, a degree of freedom in an access control can be more improved.

Fourth Exemplary Embodiment

Figure 9A:
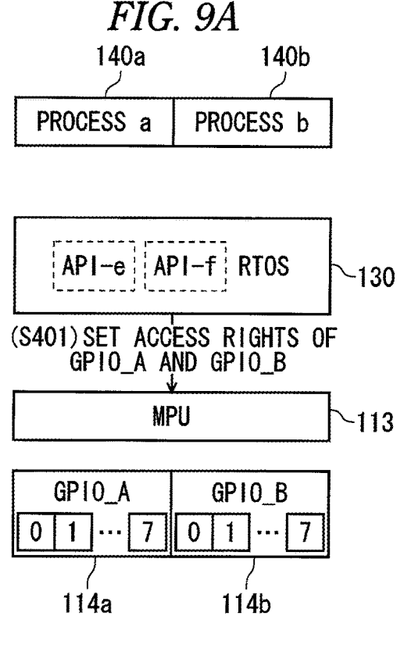
FIGS. 9A to 9D are diagrams which schematically show an operation of a fourth exemplary embodiment.

In an electronic device 100, will be described below a fourth exemplary embodiment of a procedure that a process operating on an RTOS 130 operates a GPIO 114. FIG. 9 is a diagram which schematically shows an operation of the fourth embodiment. As shown in FIG. 9A, in the fourth exemplary embodiment, the RTOS 130 obtains information of the GPIO 114 as in the first exemplary embodiment and operates an MPU 113 to set access rights for the RTOS 130 to address spaces where GPIO registers are respectively present (S401).

Figure 9B:
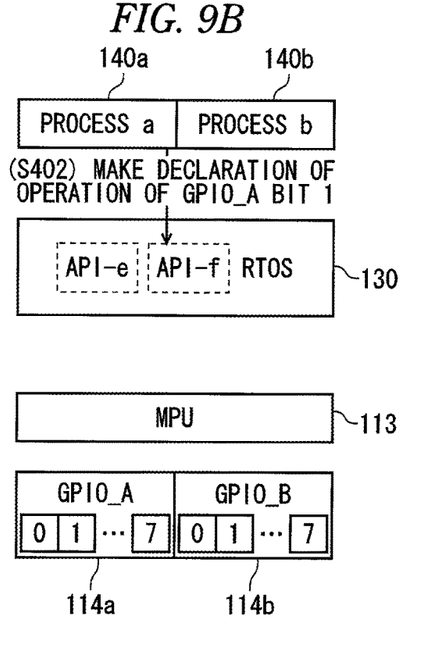

When the process a 140a operates the GPIO_A 114a, the process a 140a previously makes a declaration of an operation of the GPIO_A 114a to the RTOS 130 similarly to the second exemplary embodiment as shown in FIG. 9B (S402).

Ordinarily, the GPIO is treated for each unit of prescribed bit width, for example, 8 bit width. In the above-described exemplary embodiments, the GPIO 114 is operated for each unit of prescribed bit width. However, in the fourth exemplary embodiment, at the declaration of an operation, the GPIO 114 as an object can be designated for each of bit units. Accordingly, in the RTOS 130, an API-f is prepared which receives a declaration of the operation of each of the bits.

For instance, the process a 140a can make a declaration of an operation of a bit 1 for the GPIO_A 114a including 8 bits of a bit 0 to a bit 7. In the declaration of the operation, an arbitrary bit can be designated. A plurality of bits may be set as objects to be declared. Further, the declaration of the operation may be made not only to the bit units, but also to a unit to be processed of a device such as a channel.

Figure 9C:
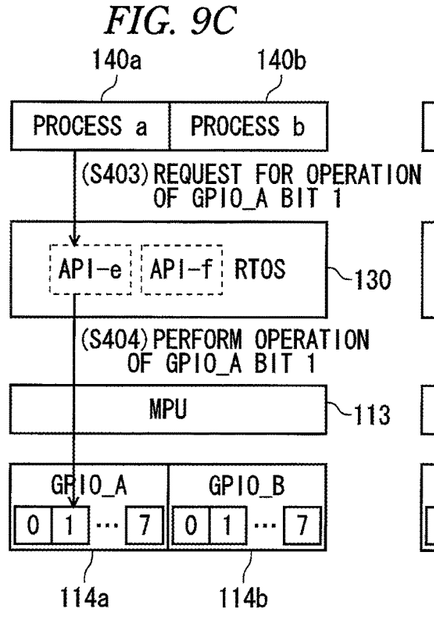

Further, in the fourth exemplary embodiment, the RTOS 130 prepares an API-e which receives a request for operating the bit unit of the GPIO from the process 140 and performs the operation of the GPIO 114 for each bit unit.

When the process a 140a operates the bit 1 of the GPIO_A 114a for which the process a 140a makes a declaration of the operation, as shown in FIG. 9C, the process a 140a requests for an operation of the bit 1 of the GPIO_A 114a by using the API-e (S403). In this stage, a setting of the access right is switched from during an execution of the process a 140a to during an execution of the RTOS 130.

Figure 9D:
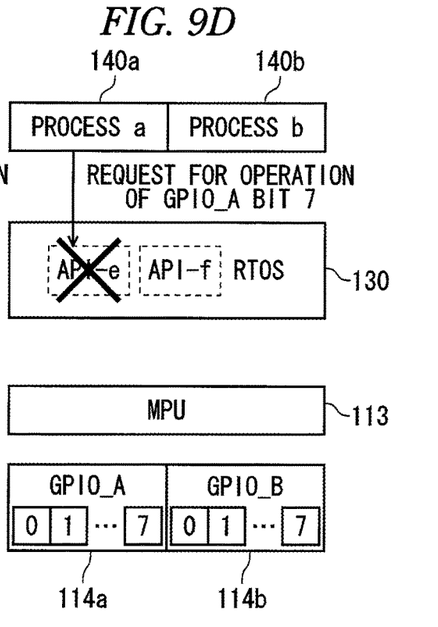

Then, the API-e makes an access to the GPIO_A register in accordance with the request to operate the bit 1 of the GPIO_A 114a (S404). As shown in FIG. 9D, when the process a 140a requests, for instance, the bit 7 of the GPIO_A 114a to be operated, since a declaration of an operation to the bit 7 is not made, the API-e does not make an access to the GPIO_A register, nor operates the bit 7 of the GPIO_A 114a.

As described above, according to the fourth exemplary embodiment, a restriction of the MPU 113 due to a boundary limitation or a limitation of the number of the access rights which can be set is not received, and further, the operation to the bit is performed only to the request for operating the bit from the process 140 which makes the declaration of the operation of the bit unit. Thus, valuable GPIO resources can be effectively utilized to more improve a degree of freedom in an access control.

The exemplary embodiments may be respectively realized by arbitrarily combining them. For instance, the third exemplary embodiment may be combined with the fourth exemplary embodiment to perform an exclusive access control for each bit unit.

What is claimed is:

1. An electronic device, in which an operating system and a process are operated, the electronic device comprising:
    a processor configured to execute program code, the program code comprising the operating system;
    a memory protection unit configured to protect an access to a register of a device arranged in an address space, wherein the operating system sets an access right for the operating system to access the register by using the memory protection unit, the operating system setting the access right on initialization of the operating system, wherein the operating system prepares an application programming interface (API), wherein the process, using the API to request an operation of the device, operates the device and accesses the register via the operating system, the process accessing the register in accordance with the operation request, and wherein the memory protection unit, in response to the process attempting to directly access the register without the operating system, detects an access violation and does not permit the process to bypass the operating system and directly access the register.

2. The electronic device according to claim 1, wherein the process makes a declaration of an operation of the device to the operating system before the operation of the device, and the operating system does not accept a request for an operation from a process which does not make a declaration of an operation.

3. The electronic device according to claim 2, wherein when a plurality of processes make a declaration of an operation to the same device, the operating system exclusively accepts the declaration of the operation from the process which most firstly makes a declaration.

4. The electronic device according to claim 2, wherein the process makes a declaration of an operation for each unit of the device to be processed, and the operating system operates the device for each unit of the device to be processed.

5. The electronic device according to claim 1, wherein the device is a general purpose IO.

6. An operating system which operates in an electronic device, the electronic device comprising a processor configured to execute program code, the program code comprising the operating system, and a memory protection unit configured to protect an access to a register of a device arranged in an address space, wherein the operating system prepares an application programming interface (API), wherein the operating system sets an access right for the operating system to access the register by using the memory protection unit, the operating system setting the access right on initialization of the operating system, wherein when the process requests an operation of the device to the API, the operating system makes an access to the corresponding register to operate the device via the operating system, and wherein the memory protection unit, in response to the process attempting to directly access the register without the operating system, detects an access violation and does not permit the process to bypass the operating system and directly access the register.

7. An access control method in an electronic device, the electronic device comprising a processor configured to execute program code, the program code comprising an operating system, and a memory protection unit configured to protect an access to a register of a device arranged in an address space, and the operating system and a process operating in the electronic device, the access control method comprising:

setting, by the operating system, an access right for the operating system to access the register by using the memory protection unit, the operating system setting the access right on initialization of the operating system;

preparing, by the operating system, an application programming interface (API);

requesting, by the process, an operation of the device to the API; and making, by the operating system, an access to the corresponding register in accordance with the request to operate the device via the operating system;

detecting an access violation in response to the process attempting to directly access the register without the operating system, and not permitting, by the memory protection unit, the process to bypass the operating system and directly access the register.

* * * * *